May 15, 1956  F. W. GASKINS  2,745,658
APPARATUS FOR BRINGING COIL SPRINGS TO TEST AND
RELIEVING STRAINS THEREIN WHILE UNDER LOAD
Filed June 23, 1950  2 Sheets-Sheet 1

INVENTOR.
FRANK W. GASKINS
BY
Zugelter & Zugelter
Attys.

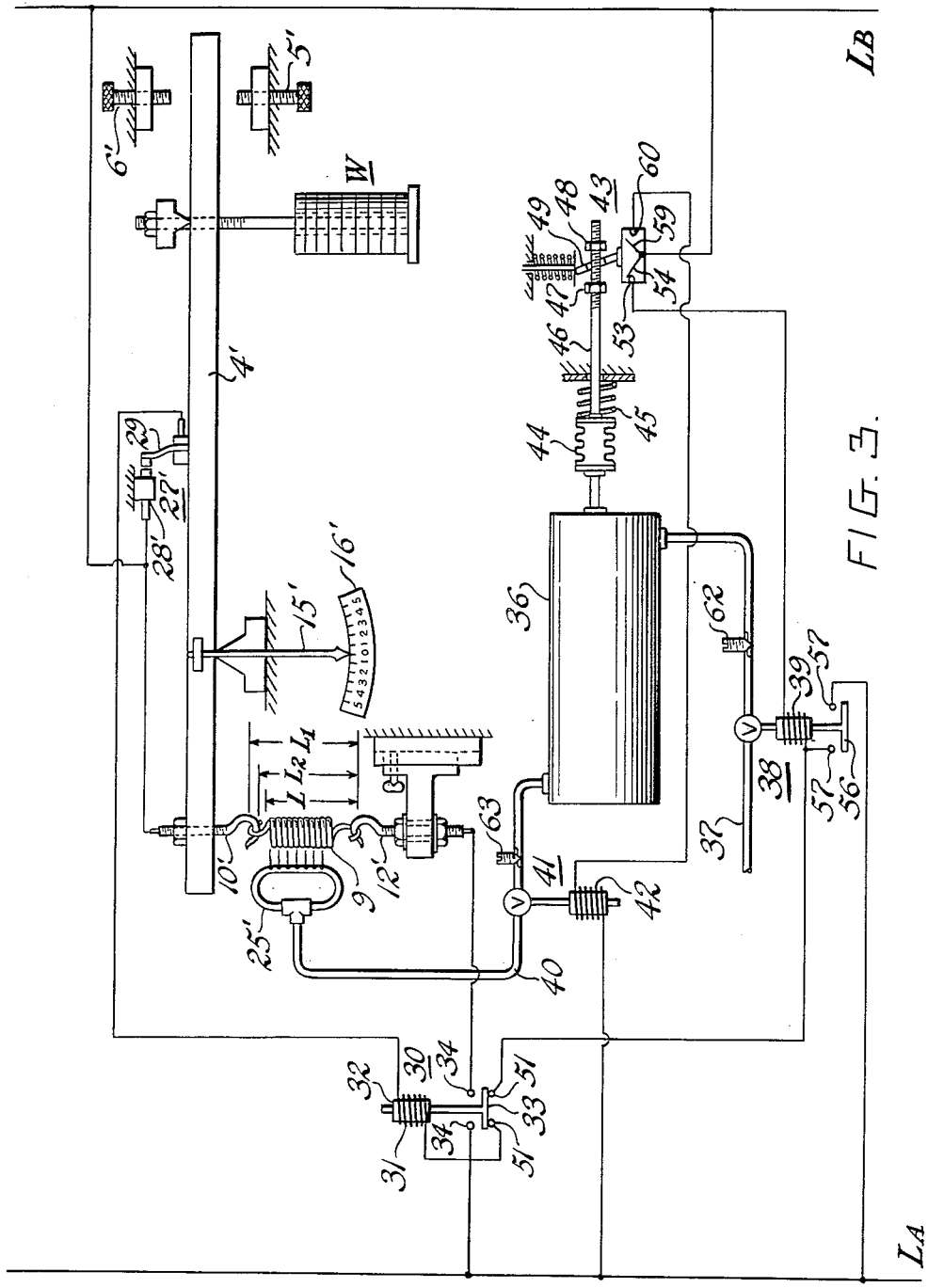

United States Patent Office 2,745,658
Patented May 15, 1956

2,745,658

APPARATUS FOR BRINGING COIL SPRINGS TO TEST AND RELIEVING STRAINS THEREIN WHILE UNDER LOAD

Frank W. Gaskins, Cincinnati, Ohio

Application June 23, 1950, Serial No. 169,966

1 Claim. (Cl. 266—4)

This invention relates to the manufacture of coil springs, and more particularly to an improved method of and apparatus for bringing the springs to test while subjected to a constant test load.

Coil springs of the extension type are made by winding steel wire or wire composed of alloys of various kinds, on a mandrel or arbor or on automatic coiling machines in which the wire is formed into a coil. Some coil springs of the extension type are tightly wound so that after winding there is initial tension in the springs. Such initial tension acts in a direction to compress the coils thereof one upon another. Coil springs of the extension type are also manufactured in which the coils thereof do not touch and there is little if any initial tension therein. The invention is applicable to either type of spring including modified forms thereof, as it is immaterial whether the springs have initial tension or not.

After a spring has been wound or coiled, the metal is under internal strains and stresses caused by the cold working to which the wire is subjected when it is coiled. When coiled the springs are not accurate and if they were tested by applying a load of known value, the elongation of the spring corresponding to the particular load would not conform to specifications. Further, it would be found that if a particular spring by chance would meet the specifications, later tests would show that the spring had changed so that its elongation would be different than it was on the previous test for the same load. It would also be found that the spring under a given load, would not come to a stable elongation, rather, the elongation would vary or drift.

Because of the fact that these internal strains render the springs unstable, the practice has been, and still is, to heat-treat the springs for the purpose of relieving the cold working strains. Such heat treatment is ordinarily carried out in a normalizing oven or furnace. Following such heat treatment the springs are tested or brought to test under a specified load, by means of accurate scales or other devices. To bring a spring to test in this manner, one end of the spring is attached to a hook on a scale beam and the other end is attached to a fixed support, the hook on the beam and on the fixed support being spaced apart such a distance that the spring must be stressed in tension sufficiently to overcome the initial tension and to stretch the spring enough to separate the coils or turns thereof. The test load is applied to the beam of the scale so that a known load is applied to the spring. The operator or tester observes how much the scale beam is off balance, and then proceeds to weaken the spring by stretching it beyond the yield point of the material one or more times until the scale beam is in balance within specified tolerance limits. When the scale beam is in balance with the test load, the spring has been elongated a predetermined or specified amount. If the scale beam remains stationary at this elongation while under the test load, the spring is regarded as having been brought to test.

Even by normalizing the springs and bringing them to test in the manner above described, it often happens that the characteristics of the spring will change after it has been once brought to test. Thus, if a spring is later tested by a customer, for example, who has received the spring at some time after the manufacturer had tested the spring and found it to be satisfactory at that time, the customer would find that the elongation at the test load would be outside the acceptable tolerances of the specifications, and the spring would be rejected.

The above procedure of normalizing and bringing coil springs to test is slow and expensive. In accordance with the method and apparatus of the invention described infra, springs may be heat-treated and brought to test while under load so that a considerable saving is effected in expense in that heat-treating furnaces are not required, and that a considerable saving in time is realized in the operations which are necessary to heat-treat and bring the spring to test. Also, by means of this invention springs may be heat-treated and brought to test in one operation and with a much higher degree of accuracy, thereby reducing materially the number of springs that are rejected after they have been heat-treated and tested, as compared to the rejections that result from the practice of prior art methods.

The material in a coil spring when under load is subjected primarily to torsional stresses, therefore, in the explanation of the invention which follows, the terms torsional yield point and torsional elastic limit will have reference to torsional stresses as distinguished from simple tension stresses and the yield point or elastic limit as computed with reference to simple tension loads.

An object of this invention is to provide a method whereby a coil spring is brought to test and heat-treated, both functions being performed in one operation while the spring is under a constant test load.

Another object of the invention is to provide a method for simultaneously bringing springs to test and heat-treating them that comprises the steps of applying a force to a coil spring of such magnitude that the spring is stretched, applying a known test load to the spring, and then while the spring is stressed by said load and said force, heating the spring to a temperature at which the torsional yield point is lowered, allowing the spring to elongate a predetermined amount while the yield point is lowered and then cooling the spring while under such load.

A further object of the invention is to provide a method of the character set forth above in which the spring is heated by electric current until the yield point has been temporarily lowered, following which, heating is discontinued and the spring is quickly cooled to raise or increase the yield point of the spring.

Another object of the invention is to provide apparatus whereby the spring may be stretched to a predetermined elongation and a fixed test load applied thereto, then while the spring is under load an electric current is caused to flow in the spring until heated to a temperature at which the yield point is lowered, in response to which the heating current is interrupted and a cooling medium is automatically applied to the spring to cool it quickly.

A still further object is to provide apparatus of the character referred to above that shall be provided with means for applying the cooling medium a predetermined but adjustable length of time after the heating current is interrupted and for controlling the length of time the cooling medium is applied.

The above and other objects of the invention will be apparent from the following description and the accompanying drawings illustrating apparatus embodying a form of the invention and by means of which the method may be performed.

In the drawings:

Fig. 3 is a more or less diagrammatic view of a weight scale and apparatus arranged to automatically bring a coil spring to test and heat-treat it while the spring is under load.

Throughout the drawings and the following description, like reference characters indicate like parts.

Figure 1:
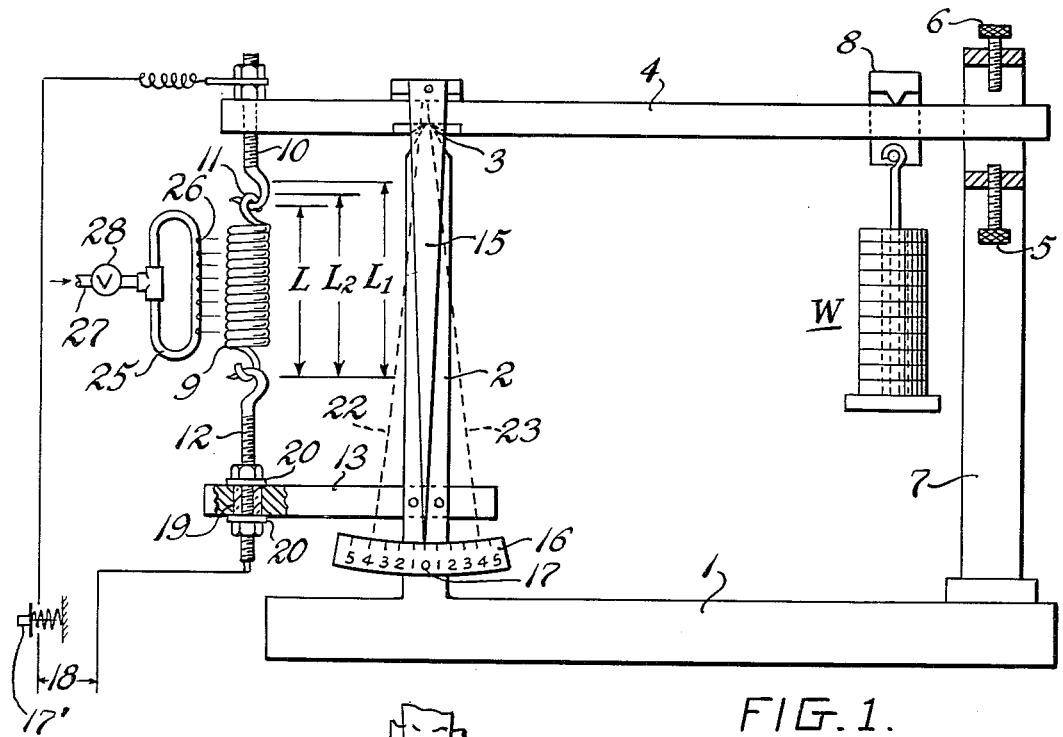
Figure 1 is a more or less diagrammatic view of apparatus whereby the method may be performed essentially by hand or under manual control.
Figure 2:
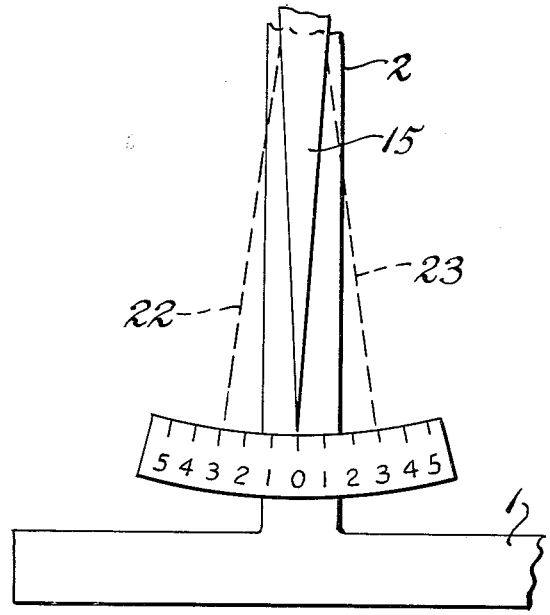
Fig. 2 is an enlarged fragmentary view of a graduated scale shown in Fig. 1.

In accordance with the method of this invention, the cold working strains of the springs are relieved and the springs are brought to test, all the while the springs are under load. Thus, for example, a coil spring of a given size and design is stretched between two supports, one of which may be fixed and the other movable between (adjustable) limits, so that the spring is elongated sufficiently to separate the coils or turns thereof when the supports are at the minimum distance apart. The length of the spring at this time, which length may be designated L, is usually less than that which is required by the specifications for the finished spring.

A substantially constant force is now applied to the movable support tending to separate the supports and elongate the spring, the amount of such force being slightly less than sufficient to cause further elongation and being determined by the specified spring strength for a given elongation. The spring is then heated to a temperature at which its yield point is lowered, which temperature may be within the range of about 400° F. to about 600° F. I prefer to heat the spring by causing an electric current to flow in the spring. The value of the current is such that the coils will be heated to a temperature at which the torsional yield point or elastic limit is lowered below the applied load. When this torsional yield point is reached, the fixed load, acting on the spring, will elongate the spring to a length $L_1$. The elongation to length $L_1$ is a controlled and fixed elongation and is accomplished by arresting or stopping travel of the weight or force which produces this elongation after the yield point has been reached. The amount of elongation occurring after the yield point has been lowered is controlled or adjusted to a value that the necessities of the particular case require, such, for example, as the size of the spring, the diameter of the wire and other factors arising out of the design and characteristics of a particular spring.

When the yield point has been sufficiently lowered as evidenced by the above described elongation, the current through the spring is interrupted. The yield point is indicated by a dropping of the beam, or in the event a fixed weight is directly attached to the spring by movement of the fixed weight. After the current has been interrupted, the spring is allowed to cool in quiescent or ambient air for a relatively short period of time. The length of time during which the spring is allowed to cool in this manner is determined by the size and weight of the spring and the diameter of the spring wire, and in typical cases may vary from about one to about ten seconds. The period of cooling in quiescent or ambient air, may conveniently be designated as a soaking period. After the soaking period, the spring is quickly cooled or quenched as by directing a blast of air against it for such a length of time that the spring cools to a temperature at which it can be handled conveniently by hand without burning the skin. As the spring is cooled by air quenching, the spring gains in strength, that is, the torsional yield point of the spring increases, whereby it tends to contract to a length between the initial length L and the yield point elongation length $L_1$. If the spring has been properly heat-treated, it will come to a stable length $L_2$ under the test load, which length will be between the lengths L and $L_1$. If the elongation of the spring does not change under the test load after the air quenching has been completed, and if the stable length corresponds to and is within the tolerance limits of the specifications, the spring has been properly heat-treated and brought to test.

By utilizing the above described method, savings are realized because normalizing furnaces are not required, the labor time of handling the springs in placing them in the normalizing furnaces, in removing them therefrom, and transporting them to the place where they are to be tested, is eliminated. Further advantages are that the springs are brought to test with a higher degree of accuracy, thereby reducing rejections to a minimum, results can be duplicated, and there is much saving in time and in the labor expended by a tester in bringing the springs to test under the test load. A still further and important advantage is that the yield point or elastic limit of the spring has been raised by the application of the heat and has been stabilized at the same time while under load. Heating springs while under load produces the following effects in the material from which they are made:

(a) The yield point is lowered while the spring is heated;

(b) The proportional elastic limit is lowered while the spring is heated;

(c) The modulus of elasticity and the modulus of rigidity are lowered while the spring is heated; and (d) The internal stresses in the material which have been caused by previous cold working such as, for instance, by forming or coiling the spring, are partially relieved. The relative degree of stress-relieving is a function of the degree of heat and the length of time that the heat is applied. This effect is permanent and remains after the spring is cooled.

If the method and manner of heating is properly controlled so that the elastic qualities of the material are not permanently lowered or otherwise damaged, then when the spring is cooled the following effects will be observed:

(e) The yield point will be higher than it was before the spring was heated.

(f) The proportional elastic limit will be higher than it was before the spring was heated.

(g) The modulus of elasticity and modulus of rigidity will be approximately the same as they were before the spring was heated.

(h) Due chiefly to the stress relief the load carrying characteristics of the spring will be much more stable under both dynamic and static loading. The spring, under a comparable load, will exhibit much less tendency to drift or creep as regards the amount of deflection produced by such load.

By my method I propose to apply a certain amount of deflection to the spring and also apply a load which is the load that the spring is designed to support at that deflection. Then by applying heat to the spring the yield point, elastic limit, and moduli of elasticity and rigidity will be so lowered that the spring will not support the load. Under this condition the spring material will be deformed. The method will cause the spring to be brought to test with the added advantages of the strengthening and stabilizing effects described in effects numbered (e), (f), and (h).

In practicing the invention, it is preferred that the springs be heated to the yield point quickly as that saves time. The waiting period between the time of turning off of the heating current and the time the air quench is applied, is varied in accordance with the mass of the coil and the diameter of the material of which it is made. Relatively heavy springs require more waiting or soaking time than light springs made from light gauge material. Also, the time required to heat the wire up to the yield point is longer for heavy springs than for light springs.

The length of time the air blast is directed against the springs varies with the mass of the spring and the quantity and velocity of the air that is discharged against it. Cooling of the spring with the air blast is continued until the spring has cooled to the temperature at which the yield point and the modulus of rigidity have each increased to a value at which the spring will come to the specified stable length at the predetermined and fixed load that is applied thereto.

The method of the invention may be conveniently carried out by utilizing a simple weigh scale as shown in the drawings, such a scale having a weigh beam mounted on a knife edge carried by a pedestal. On one side of the knife edge a known test weight is suspended from the beam. This weight is of a predetermined value and it corresponds to the test load for the particular spring being heat-treated and brought to test.

In Figure 1, a weigh scale is shown that comprises a base 1 having thereon a pedestal 2 at the upper end of which is a knife edge 3. A beam 4 is pivoted on the knife edge 3. One end of the beam is disposed to swing between adjustable limit stops 5 and 6, these stops being carried by a pedestal or support 7. On the portion of the beam 4 adjacent the adjustable stops 5 and 6 is provided a knife edge suspension 8 from which a fixed or known test weight W may be suspended. A coil spring 9, which is to be heat-treated and tested, is connected to the weigh beam 4 on the side opposite the knife edge 3 with respect to weight W. As shown, the weigh beam is provided with a hook 10 to which one eye or hook 11 of the spring may be attached. The eye or hook at the opposite end of the coiled spring is attached to hook 12 carried by a fixed support 13, this support being secured to pedestal 2 and being adjustable vertically of the pedestal.

The coil spring 9 is stretched to a predetermined length. To accomplish this the support 13 is adjusted for height so that when the eyes or hooks of the spring are attached to hooks 10 and 12, as shown, the spring will have been elongated to a length L, and the weigh beam 4 will be tilted to a position where the right hand end thereof engages stop 6. The length of the spring when elongated while the yield point has been lowered by heat is designated $L_1$, and the length of the spring after it has been brought to test and stabilized against the load W, may be called $L_2$.

As shown in Figure 1, the weigh beam 4 is provided with an indicator or pointer 15, for indicating the position of the weigh beam 4. The lower or free end of this pointer sweeps across a scale 16 having a zero point or position 17 thereof which corresponds to a balanced position of beam 4 and which is provided with graduations on either side of the zero point to indicate the length of the spring under a predetermined load before it has been heat-treated, as well as afterwards.

As shown in Figure 1, means are provided for passing an electric current through the coil spring. This means comprises a push button switch 17' and supply conductors 18 that are connected to a source of voltage, preferably low voltage, and high current capacity. To avoid a short circuit through the scale, one or the other of hooks 10 and 12 is insulated from the scale. As shown, hook 12 is insulated from support 13 by an insulating bushing 19 and insulating washers 20.

When spring 9 has been attached to hooks 10 and 12 as shown, the push button switch 17' is closed whereby current flows through the coil spring and heats it. When the spring has been heated to a temperature at which its torsional yield point has been lowered, the weigh beam 4, under the influence of weight W, will fall or tilt clockwise about its fulcrum 3. The beam falls until it is arrested by stop 5. When the beam falls, the spring is elongated to a length $L_1$. The amount of elongation after the yield point has been lowered is controlled or limited by adjusting the position of stop 5.

As soon as the beam drops, the push button switch 17' is opened, thereby interrupting the heating current to the coil spring. It will be observed that when the coil spring has been heated to the temperature at which the spring yields, pointer 15 will be deflected to a position such as indicated by the dotted line 22, dotted line 23 representing the position of scale beam 4 when it was in engagement with the upper stop 6. Positions 22 and 23 of the indicator 15 are on opposite sides of the zero point of the scale. In practice, stops 5 and 6 are so adjusted that the positions of the pointer as indicated by lines 22 and 23, are about equally spaced from the zero point 17.

After the current has been interrupted, by opening the push button switch 17' the spring is allowed to cool for a short period of time. This cooling period is usually measured in seconds when small springs are involved. As it cools, the yield point and modulus of rigidity commence to increase. When it is noticed that pointer 15 begins to move from its position 22 towards the zero point, a blast of air is directed against the coil spring to air-quench it and cool it quickly. The air blast is applied by means of a pipe 25 having a series of orifices 26 disposed parallel to and along the length of the spring. The pipe 25 as shown, may be in the form of an elongated oval to which a supply pipe 27 is connected and in which a stop cock or valve 28 may be included for manually turning on or shutting off the air supply to pipe 25. As the spring cools, the pointer starts moving from its position 22 toward the zero point. When the spring has cooled to a temperature at about which the tester could handle the spring without burning his fingers, the air blast is shut off. The pointer 15 is then watched or observed to see whether or not it drifts toward the zero mark or past it to the right side thereof. If it comes to a stable position at the zero mark or within specified tolerance limits on either side of the zero mark while still under the load W, the spring is regarded as satisfactory and acceptable, and that it has met the specifications. For example, the specification for the spring may require that the pointer 15 come to a stable position within one, two or three divisions on either side of the zero mark.

In Fig. 3 a weigh scale, similar to the one indicated in Figure 1, is shown in combination with apparatus for automatically applying the heating current to the coil spring 9, for automatically interrupting the heating current when the yield point has been reached or exceeded and for automatically controlling the time when the air blast is applied and the time when the air blast is shut off. By means of the apparatus shown in Fig. 3, I may automatically control the soaking period for the spring, as well as the blast or quench period. In Fig. 3 parts corresponding in function to those illustrated in Figure 1, are designated by the same reference characters with primes affixed.

On the weigh beam 4' a switch 27' is provided having a stationary contact member 28' and a movable resilient or leaf spring contact member 29, the latter being secured to the weigh beam and moving to or from circuit-making position in response to movement of the beam. Switch 27' controls a main switch 30, which, when it closes, connects the coil spring to the power supply lines $L_A$, $L_B$. Switch 30 comprises a solenoid 31 whose plunger or armature 32 operates a movable contact member 33. When the solenoid 31 is energized, contact member 33 is lifted to bridge stationary contacts 34 whereby the heating circuit for coil spring 9 is established.

The apparatus for supplying the controlled air blast to the coil spring 9 comprises a pressure tank or receiver 36 to which is connected a supply pipe 37 from which the receiver may be charged with compressed air up to any predetermined or desired value of pressure, say, 50 or 100 pounds per square inch. The supply pipe 37 is provided with a solenoid operated valve 38. Solenoid 39 that actuates the valve 38, is initially energized only when solenoid 31 is de-energized. The receiver 36 is connected by a pipe 40 to the air blast pipe or tube 25'.

In pipe 40 is a solenoid operated vale 41, the solenoid 42 of which is under the control of a pressure actuated toggle switch 43. The pressure actuated switch 43 also operates to control the circuit of solenoid 39.

Switch 43 may be actuated by a pressure responsive device such as a bellows 44 which is connected to respond to the pressure of the air in the receiver 36. The bellows acts against a compression spring 45 so that it will take a definite but different position for each value of pressure existing in the receiver at any particular time. The movable end of the bellows is provided with a rod or link 46 having spaced stops 47 and 48 thereon and arranged to operate a toggle 49 that controls the position of the contact members in switch 43. As shown, switch 43 is a double throw switch, the movable and stationary contacts of which are so arranged that solenoid 42 can not be energized while solenoid 39 is energized.

When the pressure in receiver 36 is at a predetermined low value, the toggle switch will be in the position shown in the drawing in which position solenoid 39 will be energized when solenoid 31 of switch 30 is de-energized. When switch 30 is open, its solenoid having been de-energized by the opening of switch 27' its movable contact member 33 bridges stationary contact members 51 whereby an energizing circuit for solenoid 39 is established that extends from line L$_A$ through contact members 51 bridged by member 33, solenoid 39, contact members 53 and 54 of switch 43, to line L$_B$. As soon as the circuit for solenoid 39 has been established, to open the inlet valve, the plunger of the valve actuates a holding circuit switch member 56 into engagement with contact members 57, whereby solenoid 39 will remain energized even though, by chance, solenoid 31 should be energized to open the circuit through contact members 51.

As the pressure increases in receiver 36, bellows 44 expands, and when the pressure reaches a predetermined value, the toggle switch 43 is actuated to a position where its movable contact member 59 engages stationary contact member 60 and contact member 54 is dis-engaged from contact member 53. When switch 43 has been actuated to its high pressure position, solenoid 39 is de-energized and valve 38 is closed, thereby shutting off the air supply to receiver 36. When contact members 59 and 60 of the toggle switch are closed, the energizing circuit for solenoid 42 is established, whereby valve 41 is opened and air is supplied to the air-quench pipe or tube 25' to cool spring 9.

By providing a needle valve 62 in pipe 37 between solenoid valve 38, and receiver 36, and a similar needle valve 63 in pipe 40, at a point between valve 41 and receiver 36, the time required to charge the receiver 36 with compressed air to the predetermined pressure, and the time required for the receiver to discharge compressed air against the coil spring until the pressure in the receiver drops to a predetermined low valve, may both be controlled. Thus the soaking time of the spring 9 and the length of the quenching period may both be controlled. If the soaking and air-quench periods are short, as in the case of light springs, the needle valves may be omitted or opened wide. By adjusting the tension of the loading or gradient spring on bellows 44 and by adjusting the position of stops 47 and 48, the differential between the maximum and the minimum pressures that will be established in the receiver may be adjusted and controlled as desired.

When a spring 9 is to be heat-treated and brought to test, its opposite ends are attached to hooks 10' and 12' in the same way in which the spring was attached to hooks 10 and 12 in Figure 1. When so attached, beam 4' will swing upwardly against the upper stop 6' at which point switch 27' is closed and heating current is supplied to spring 9. When beam 4' is in this position, pointer 15' will be in a position to the right of the zero point on the scale 16'.

The deflection to the right of the zero point being limited by adjusting the upper stop 6', when spring 9 reaches a temperature at which beam 4' drops because of the fixed load W, it continues to fall until it is arrested by stop 5'. As soon as the beam drops, switch 27' opens, the heating current to coil spring 9 is interrupted by the opening of switch 30. When switch 30 opens it establishes the circuit for the solenoid 39 of the solenoid valve 38 and air is delivered to the receiver 36. As soon as the pressure builds up to a predetermined value, the toggle switch 43 is actuated to the position where solenoid 39 is de-energized and the circuit for solenoid 42 is established. Valve 41 then opens and the air blast is delivered against the spring. As soon as the pressure in tank or receiver 36 has decreased to a predetermined value, the air blast is shut off automatically by the bellows 44 acting through the toggle switch 43. The time required for the pressure to drop to the cut-off point for the air blast, can be adjusted to the length of air-quench time required.

When the yield point of the spring has lowered to the point where the beam will drop against the lower stop 5', spring 9 will have been stretched to a length L$_1$ and pointer 15' will be in a position to the left of the zero point of scale 16'. When the spring has been cooled by the air blast, pointer 15' will move towards the zero point on the scale. If the spring is properly made and its characteristics are satisfactory, it will come to rest in a stable position within the allowable tolerances on either side of the zero mark.

While the drawings show that heating current is passed through the spring by a directly applied potential, it will be appreciated that the heating current may be established in the spring by electromagnetic induction.

As stated previously herein, the size of the spring 9, the diameter of the wire of which it is made, determines how quickly it can be heated to the yield point and how quickly it can be air-quenched to a temperature where it will be stable to the test load and cool enough for a tester to handle the spring with his fingers without being burned. The soaking period between the time when the current to the spring is interrupted and the air blast is applied, is dependent upon the size of the spring, the mass thereof, and the diameter of the wire. Springs of extremely fine wire will of course require less soaking time and a shorter air-quench.

From the foregoing, it will be apparent that the method of this invention may be practiced by various forms of apparatus and that the apparatus for carrying out the method automatically may also be modified. It is desired, therefore, that only such limitations shall be placed on the invention as are required by the state of the prior art and the scope of the appended claims.

What I claim as new and desire to secure by Letters Patent, is:

In combination, a scale beam having a frictionless fulcrum, a constant predetermined load on said beam disposed to tilt the beam in one direction, a stationary support member spaced from said beam, said beam and support being provided with means to which the ends of a coiled steel spring may be connected, the distance between the points of attachment of said spring to said beam and to said support being such that the spring is elongated to a length that is proportioned to the minimum distance between said beam and support, the force of said spring on said beam tending to turn the beam in a direction opposite to the direction of turning by said load, means for limiting deflection of said beam in either direction from its balanced position, means for connecting said spring to a source of supply of current when the beam is tilted off balance by the spring force, means responsive to dropping of the beam resulting when the spring has been heated to a temperature at which it yields at the load applied to said beam for interrupting said heating current, means for directing a coolant against said spring, and means responsive to the dropping of said beam for connecting said coolant directiong means to a source of supply of coolant, and timing means for automatically interrupting the flow of coolant when the spring has cooled.

References Cited in the file of this patent

UNITED STATES PATENTS

| | | |
|---|---|---|
| 1,274,919 | MacDonald | Aug. 6, 1918 |
| 1,321,530 | McDonald | Nov. 11, 1919 |
| 1,334,663 | McDonald et al. | Mar. 23, 1920 |
| 1,355,521 | Alexander et al. | Oct. 12, 1920 |
| 1,570,815 | Wylie | Jan. 26, 1926 |
| 1,978,219 | Otte | Oct. 23, 1934 |
| 2,261,878 | Hathaway | Nov. 4, 1941 |
| 2,666,723 | Stewart | Jan. 19, 1954 |